(12) United States Patent
Zhang et al.

(10) Patent No.: US 7,728,263 B2
(45) Date of Patent: Jun. 1, 2010

(54) PROCESS OF CONTROLLING AN OPERATION OF ELECTRIC KETTLE

(76) Inventors: Mohan Zhang, Block 9, Tongfuyu Industrial Zone, Tanglang, Xili, Nanshan, Shenzhen (CN); Yaolun Wang, Block 9, Tongfuyu Industrial Zone, Tanglang, Xili, Nanshan, Shenzhen (CN)

(*) Notice: Subject to any disclaimer, the term of this patent is extended or adjusted under 35 U.S.C. 154(b) by 149 days.

(21) Appl. No.: 11/632,092

(22) PCT Filed: Sep. 27, 2005

(86) PCT No.: PCT/CN2005/001582

§ 371 (c)(1), (2), (4) Date: Jan. 9, 2007

(87) PCT Pub. No.: WO2007/036066

PCT Pub. Date: Apr. 5, 2007

(65) Prior Publication Data

US 2008/0312774 A1    Dec. 18, 2008

(51) Int. Cl.
H05B 1/02 (2006.01)

(52) U.S. Cl. .............. 219/494; 219/497; 219/429; 219/441; 374/102

(58) Field of Classification Search ........... 219/494, 219/497, 499, 501, 506, 429, 441; 374/102
See application file for complete search history.

(56) References Cited

U.S. PATENT DOCUMENTS

| 5,794,520 | A  | * | 8/1998  | Hefford ............... 99/323.3 |
| 6,172,341 | B1 | * | 1/2001  | Hoffmann et al. ........ 219/441 |
| 6,828,527 | B2 | * | 12/2004 | Simic-Glavaski et al. .. 219/438 |
| 7,279,660 | B2 | * | 10/2007 | Long et al. ............ 219/441 |
| 2006/0207986 | A1 | * | 9/2006 | Brown ................. 219/386 |

* cited by examiner

Primary Examiner—Mark H Paschall
(74) Attorney, Agent, or Firm—Raymond Y. Chan; David and Raymond Patent Firm

(57) ABSTRACT

A process of controlling an operation of an electric kettle includes the steps of initializing a microprocessor to detect a water temperature via a temperature sensor to set a system parameter; checking a status of a control circuit; determining a preserve temperature of the water; verifying the temperature sensor to protect the temperature sensor from being burnt; determining a condition of the water whether the water is needed to be heated up or preserved; and sending out a control signal to the control circuit in responsive to the condition of the water to heat up the water or maintain the water at the preserve temperature. Therefore, the present invention is adapted to accurately control the whole process of the electric kettle.

14 Claims, 6 Drawing Sheets

PROCESS OF CONTROLLING AN OPERATION OF ELECTRIC KETTLE

BACKGROUND OF THE PRESENT INVENTION

1. Field of Invention

The present invention relates to an electrical appliance, and more particularly to a process of controlling an operation of an electric kettle.

2. Description of Related Arts

Conventional electric kettle is useful in our daily life, and brings us lots of conveniences. The conventional electric kettle generally incorporates with a simple controlling process for controlling the boiling point of the water, for cutting off the power when the water in the electric kettle is evaporated, and for keeping the water at a predetermined temperature. However, such controlling process has a major drawback that the process fails to accurately control the temperature of the water.

SUMMARY OF THE PRESENT INVENTION

A main object of the present invention is to provide a process of controlling an operation of an electric kettle, wherein the controlling process is integrated with different individual processes to accurately control the operation of the electric kettle.

Accordingly, in order to accomplish the above object, the present invention provides a process of controlling an operation of an electric kettle for containing a predetermined volume of water therein, wherein the process comprises the steps of:

(a) initializing a microprocessor to detect a temperature of water in the electric kettle so as to set a system parameter;

(b) checking a status of the control circuit whether the control circuit is either at "ON" mode or "OFF" mode;

(c) determining a preserve temperature of the water for maintaining the water at the preserve temperature;

(d) checking a status of a cut off circuit for preventing the water from being totally evaporated;

(e) determining a condition of the water whether the water is needed to be heated up or preserved at the preserve temperature; and (f) sending out a control signal to the control circuit in responsive to the condition of the water in order to heat up the water or maintain the water at the preserve temperature.

According to the preferred embodiment, after the water is either heated up or maintained at the preserve temperature in the step (f), the process returns back to the step (a) to form a loop control.

Accordingly, the microprocessor of the electric kettle comprises a temperature sensor having two spaced apart detecting points to detect the water temperature five times per second so as to accurately determine the water temperature by the average of the values at the detecting points in one second.

The microprocessor of the present system contains the parameters of a preset heat up cycle, the maximum heat up time and a parameter of "heat up and preserve", wherein the parameters of the microprocessor are used for incorporating with different water capacities of the kettle bodies and different heating powers in order to set the optimized heat up cycles and the maximum heat up time.

The microprocessor of the present invention determines the status of the heat up circuit. When the heat up circuit is at an operation state, i.e. either the heat up mode or the preserve mode, the microprocessor determines the time required for heating up the water. When the heat up circuit is at an idle state, the microprocessor determines the heat up time is zero.

The microprocessor also determines the water whether is in preserve status. When the heat up circuit is at the preserve mode, the microprocessor compares the average value between the two detecting points with the preset temperature threshold. When the average value is larger than a lower limit of the preset temperature threshold, the detecting points are checked whether the detecting points are normally operated after the time period of heating up. When the average value is smaller than the lower limit of the preset temperature threshold, the detecting points are checked whether the detecting points are normally operated. When the heat up circuit is not in the preserve mode, i.e. the idle state, the detecting points are checked whether the detecting points are normally operated. If the detecting points are operated abnormally, the heat up circuit is automatically cut off and an alarm signal is generated. When the detecting points are normally operated, the detecting points are protected to prevent the detecting points from being burnt when the detecting points does not contact with the water.

The microprocessor also determines whether the water is needed to be heated up or preserved at the preserve temperature. Firstly, the microprocessor must receive a request signal before the microprocessor determines the water is needed to be heated up or preserved. When a heat up request signal is received by the microprocessor, the microprocessor will send out a heat up control signal to the control circuit so as to control the process of heating up the water in the kettle body until the water is boiled.

The microprocessor also determines whether there is a heat up request signal. Accordingly, the microprocessor determines whether there is a preserve request signal when the microprocessor does not receive any heat up request signal. If there is no preserve request signal, the process will return back to its initial state. When there is a preserve request signal, the microprocessor will verify whether the preserve request signal is a "heat up and preserve" request signal.

The microprocessor also determines whether there is a "heat up and preserve" request signal. If there is the "heat up and preserve" request signal, the heat up request signal is sent to the control circuit to heat up the water in the kettle body, wherein after the water is heated up, the water is maintained at the preserve temperature. If the preserve request signal is not the "heat up and preserve" request signal, the preserve request signal is sent to the control circuit for maintaining the water at the preserve temperature.

The microprocessor also protects the detecting points of the temperature sensor from being "dry" burnt. The microprocessor determines the temperature rate change in responsive to the average water temperature at the detecting points of the temperature sensor, so as to compare the temperature rate change with the preset threshold. When the temperature rate change is larger than the preset change threshold, the microprocessor sends out the control signal to the control circuit to stop heating up the water and to generate an alarm signal. When the temperature rate change is smaller than the preset change threshold, the microprocessor will determine the temperature acceleration by the temperature change with respect to time. When the temperature acceleration is larger than the preset acceleration threshold, the power of the heat up circuit is cut off and the alarm signal is generated. In addition, when the continuous heat up time is longer than the preset maximum heat up time, the power of the heat up circuit is cut off and the alarm signal is generated. During the microprocessor controls the heating up process, the microprocessor determines the current temperature rate change and compares the temperature rate change with the previous temperature change. When the current rate change tends to get closer to the previous rate change, the control circuit will stop sending out the heat up signal to stop heating up the water. During the microprocessor controls the preserve process, the microprocessor is arranged to maintain the water at the preserve temperature. When the average water temperature is lower than a safety threshold in which the safety threshold is a preset temperature for the user safely drinking the water, the microprocessor sends out the control signal to the control circuit to heat up the water. When the average water temperature is higher than or equal to the safety threshold, the microprocessor sends out the control signal to the control circuit to stop heating up the water. The actual water temperature, i.e. the average temperature, is compared with the preset temperature threshold when the microprocessor sends out the control signal to the control circuit to heat up the water. When the actual water temperature is higher than the preset temperature threshold, the microprocessor sends out the control signal to the control circuit to stop heating up the water. When the actual water temperature is smaller than the preset temperature threshold, the microprocessor determines the temperature rate change to compare with the preset temperature rate change threshold. When the temperature rate change is larger than the preset temperature rate change threshold, the microprocessor sends the control signal to the control circuit to stop heating up the water. When the temperature rate change is smaller than the preset temperature rate change threshold, the microprocessor sends the control signal to the control circuit to time-delay the stop of heating up the water.

The control process of the present invention contains distinctive features in comparison with the conventional control process for the electric kettle. The present invention incorporates with the microprocessor to control the water temperature in the kettle body, to determine the system parameters, to verify the status of the heat up circuit, to determine the water at the preserve state, to prevent the detecting points of the temperature sensor from being "dry" burnt, and to control both the heat up and preserve processes. The present invention integrates with different individual processes into one single process to control the operation of the electric kettle. In other words, by incorporating with the microprocessor, the present invention is adapted to accurately control the whole process of the electric kettle.

BRIEF DESCRIPTION OF THE DRAWINGS

FIG. 2-1 is a flow diagram of the process of controlling an operation of an electric kettle according to the above preferred embodiment of the present invention.

FIG. 2-2 is a continuous flow diagram from FIG. 2-1 of the process of controlling an operation of an electric kettle according to the above preferred embodiment of the present invention.

FIG. 4-1 is a flow diagram of the process for maintaining the water at the preserve temperature according to the above preferred embodiment of the present invention.

FIG. 4-2 is a continuous flow diagram from FIG. 4-1 of the process for maintaining the water at the preserve temperature according to the above preferred embodiment of the present invention.

DETAILED DESCRIPTION OF THE PREFERRED EMBODIMENT

Figure 1:
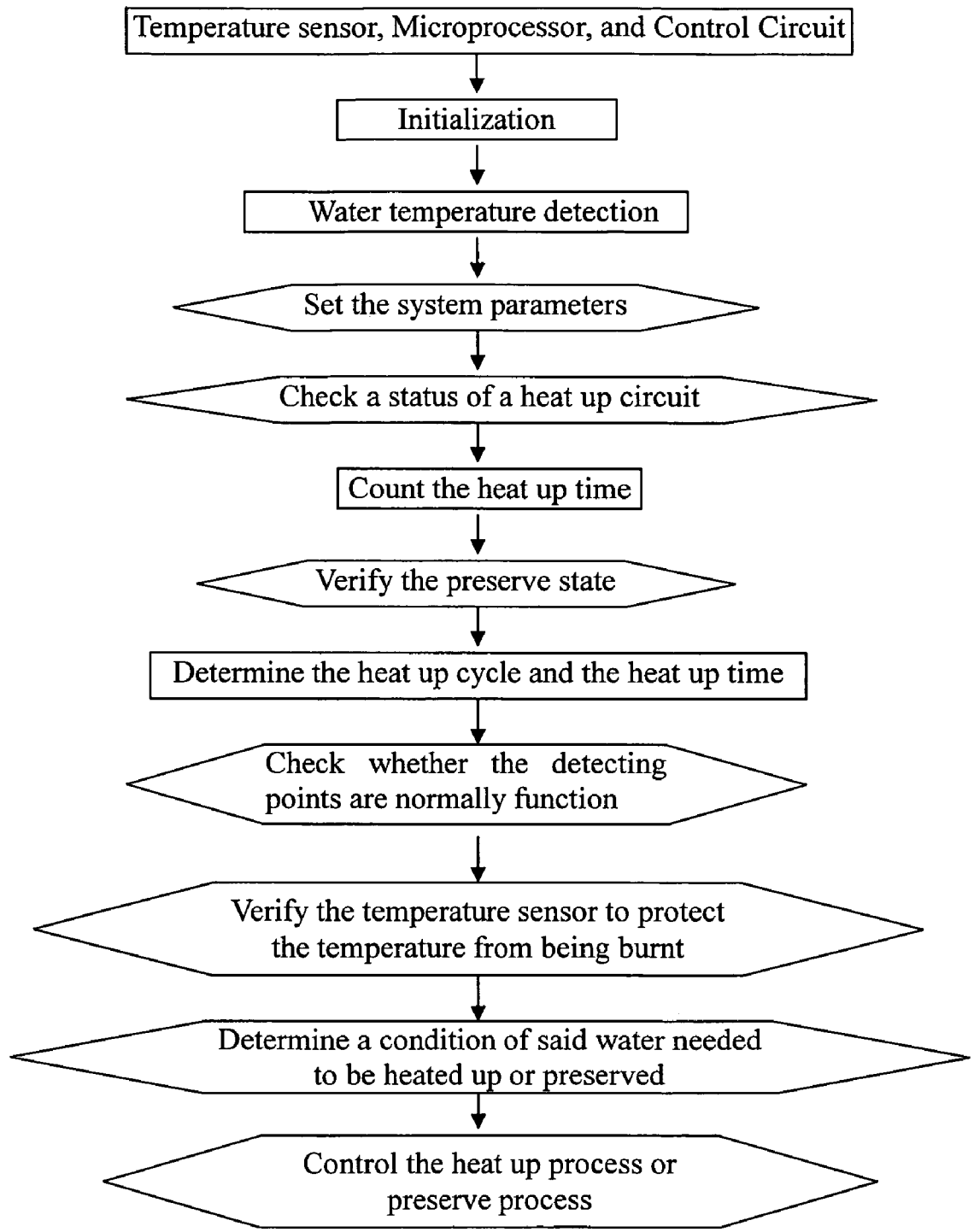
FIG. 1 is block diagram of a process of controlling an operation of an electric kettle according to a preferred embodiment of the present invention.

Referring to FIG. 1 of the drawings, a process of controlling an operation of an electric kettle according to a preferred embodiment of the present invention is illustrated, wherein the electric kettle comprises a kettle body for containing a predetermined volume of water. The controlling process comprises the following steps.

(1) Preset a temperature sensor, a microprocessor and a control circuit at the electric kettle.

(2) After the power of the electric kettle is on, detect a temperature of water in the electric kettle via the temperature sensor and send the detection signal to the microprocessor.

(3) Preset a system parameter by the microprocessor.

(4) Check a status of the heat-up circuit whether the heat-up circuit is either at "ON" mode or "OFF" mode and determine a heat up time period for continuously heating up the water.

(5) Determine a preserve status of water for maintaining the water at a preserve temperature within a predetermined preserve cycle and time period.

(6) Check the temperature sensor whether the detecting point of the temperature sensor is in a normal operation mode.

(7) Check a status of a cut off circuit in a controllable manner, wherein the cut off circuit is arranged to cut off the power of the control circuit for preventing the water from being totally evaporated.

(8) Determine a condition of the water whether the water is needed to be heated up or preserved at the preserve temperature.

(9) Send out a control signal to the control circuit in responsive to the condition of the water in order to heat up the water or maintain the water at the preserve temperature.

(10) Return to the step (1) after the water is heated up or maintained at the preserve temperature in the step (9).

Figures 1, 2:
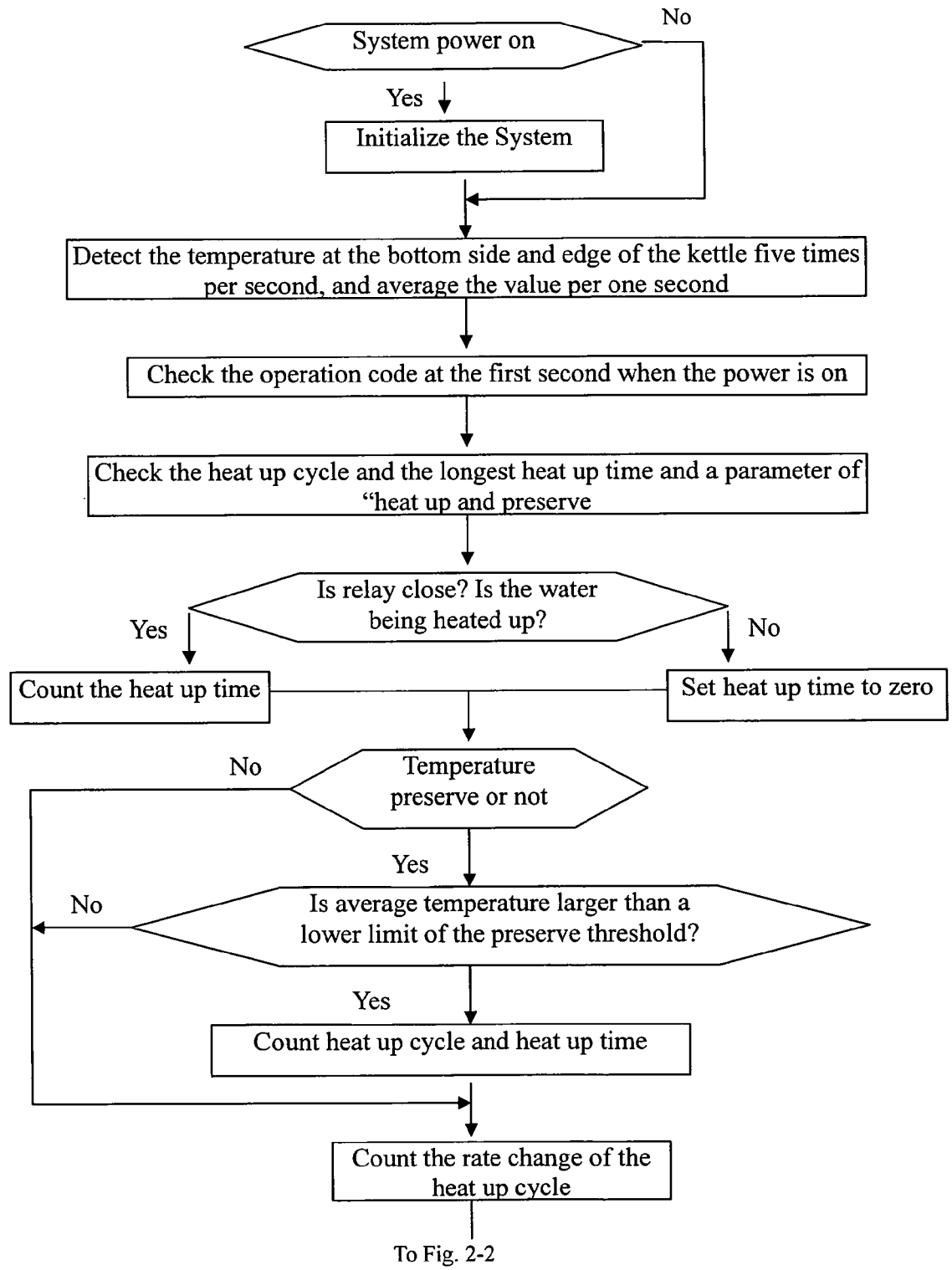
Figure 2:
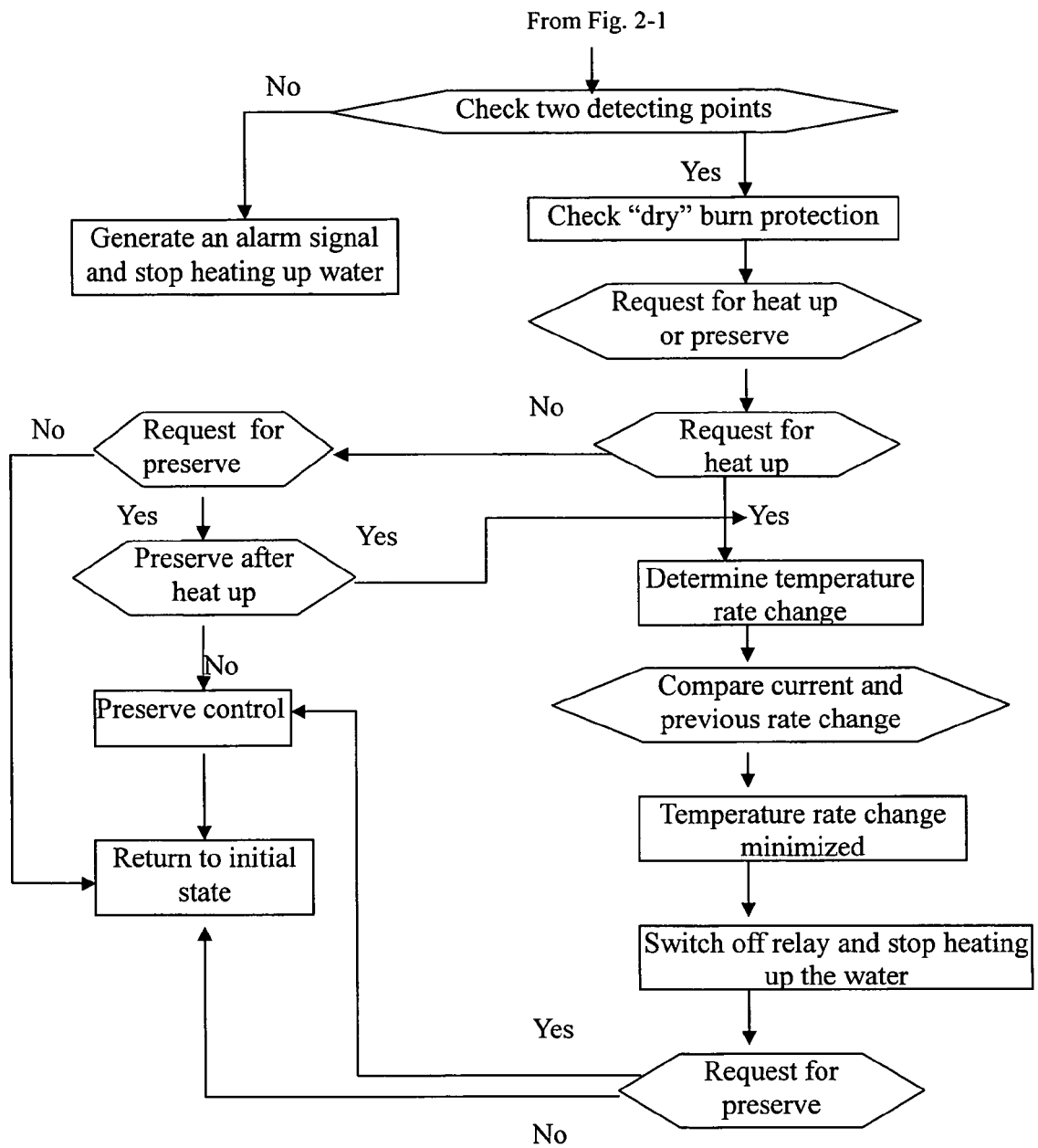

Referring to FIG. 2-1 and FIG. 2-2 of the drawings, the microprocessor controls the temperature sensor to detect the water temperature in the electric kettle five times per second. Accordingly, the temperature sensor contains at least two detecting points provided at a bottom wall and a peripheral edge of a kettle body of the electric kettle respectively to detect the temperature of the water in the kettle body. The water temperature is determined by averaging the values at the detecting points measured in one second. The microprocessor contains 10 sets of heat up cycles, 10 set of maximum heat up time and an operation code of "temperature maintain after heat up". The parameters of the microprocessor are used for incorporating with different water capacities of the kettle bodies and different heating powers thereof in order to set the optimized heat up cycle and the maximum heat up time. The microprocessor comprises a A/D converter (analogy to digital converter) that the operation code is obtained through an input terminal of the A/D converter, wherein the corresponding parameters can be determined to match with the corresponding set of heat up cycle and maximum heat up time for the capacity of the kettle body and the heating power thereof, and to verify whether the water in the kettle body needed to be maintain at the preserve temperature after the water is heated up. The microprocessor also checks the status of the heat up circuit that whether the relay of the heat up circuit is in closed position and whether the water is in heating process. When the heat up circuit is switched on, the microprocessor determines the time period required for continuously heating up the water. When the heat up circuit is switched off, the time threshold determined by the microprocessor for heating up the water is zero. In other words, the water is stopped from being heated up.

When the microprocessor determines the water is in preserve status, the control circuit is set for maintaining the water at the preserve temperature. Accordingly, the detecting points will be checked at any state. When the heat up circuit is at the preserve mode, the microprocessor compares the average value between the two detecting points with the preset temperature threshold. When the average value is larger than a lower limit of the preset temperature threshold, the detecting points are checked whether the detecting points are normally operated after the time period of heating up. When the average value is smaller than a lower limit of the preset temperature threshold, the detecting points are checked whether the detecting points are normally operated. When the heat up circuit is not in the preserve mode, the detecting points are checked whether the detecting points are normally operated. The detecting points are also checked whether the detecting points are normally operated when the rate change of the heat up cycle. If the detecting points are operated abnormally, the heat up circuit is automatically cut off and an alarm signal is generated. It is worth to mention that when the detecting points are normally operated, the detecting points are protected to prevent the detecting points from being burnt when the detecting points does not contact with the water.

The microprocessor must receive a request signal before the microprocessor determines the water is needed to be heated up or preserved. When a heat up request signal is received by the microprocessor, the microprocessor will send out a heat up control signal to the control circuit so as to control the process of heating up the water in the kettle body until the water is boiled. The microprocessor determines whether there is a preserve request signal when the microprocessor does not receive any heat up request signal. If there is no preserve request signal, the process will return back to its initial state. When there is a preserve request signal, the microprocessor will verify whether the preserve request signal is a "heat up and preserve" request signal. If there is the "heat up and preserve" request signal, the heat up request signal is sent to the control circuit to heat up the water in the kettle body, wherein after the water is heated up, the water is maintained at the preserve temperature. If the preserve request signal is not the "heat up and preserve" request signal, the preserve request signal is sent to the control circuit for maintaining the water at the preserve temperature.

The microprocessor controls the process of heating up the water by determining the rate change of the water temperature. Accordingly, the microprocessor compares the current rate change of the water temperature with a previous rate change of the water temperature. When the current rate change tends to get closer to the previous rate change, the control circuit will stop sending out the heat up signal. Therefore, once the water is heated up, the process will return back to its initial state.

Figure 3:
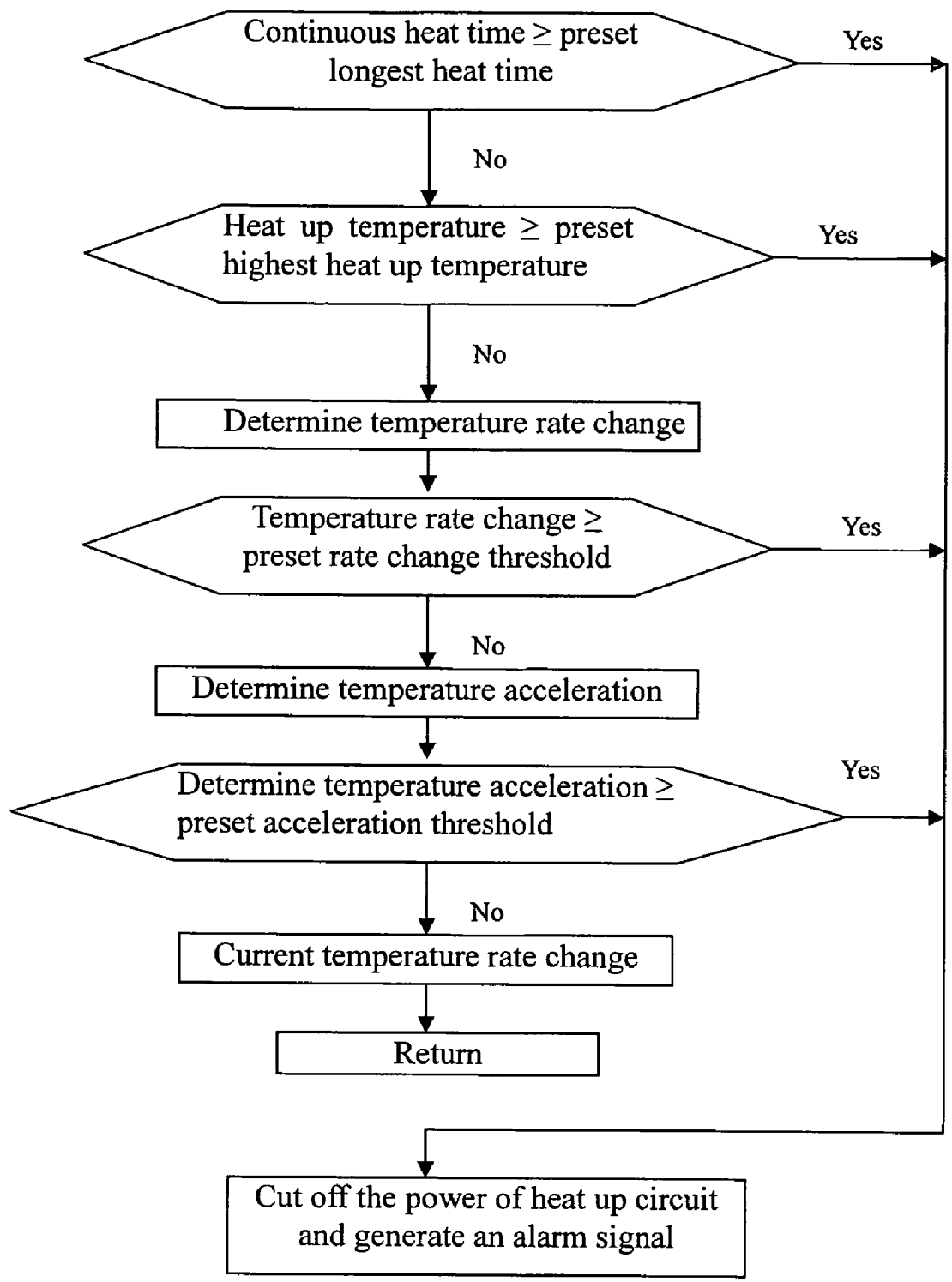
FIG. 3 is a flow diagram of the process of cut off circuit for preventing the water from being totally evaporated according to the above preferred embodiment of the present invention.

As shown in FIG. 3, when the microprocessor is protected to prevent the microprocessor from being "dry" burnt, the control circuit is electrically connected to the heating source. When the continuous heat up time is longer than the preset maximum heat up time, the power of the heat up circuit is cut off and the alarm signal is generated. When the continuous heat up time is shorter than the preset maximum heat up cycle, the temperature sensor will keep detecting the water temperature. When the water temperature is higher than the preset temperature threshold, the power of the heat up circuit is cut off and the alarm signal is generated. When the water temperature is lower than the preset temperature threshold, the microprocessor will compare the temperature change with the preset change threshold. When the temperature change is larger than the preset change threshold, the power of the heat up circuit is cut off and the alarm signal is generated. When the temperature change is smaller than the preset change threshold, the microprocessor will determine the temperature acceleration by the temperature change with respect to time. When the temperature acceleration is larger than the preset acceleration threshold, the power of the heat up circuit is cut off and the alarm signal is generated. When the temperature acceleration is smaller than the preset acceleration threshold, the microprocessor will keep the current temperature change.

Figures 1, 4:
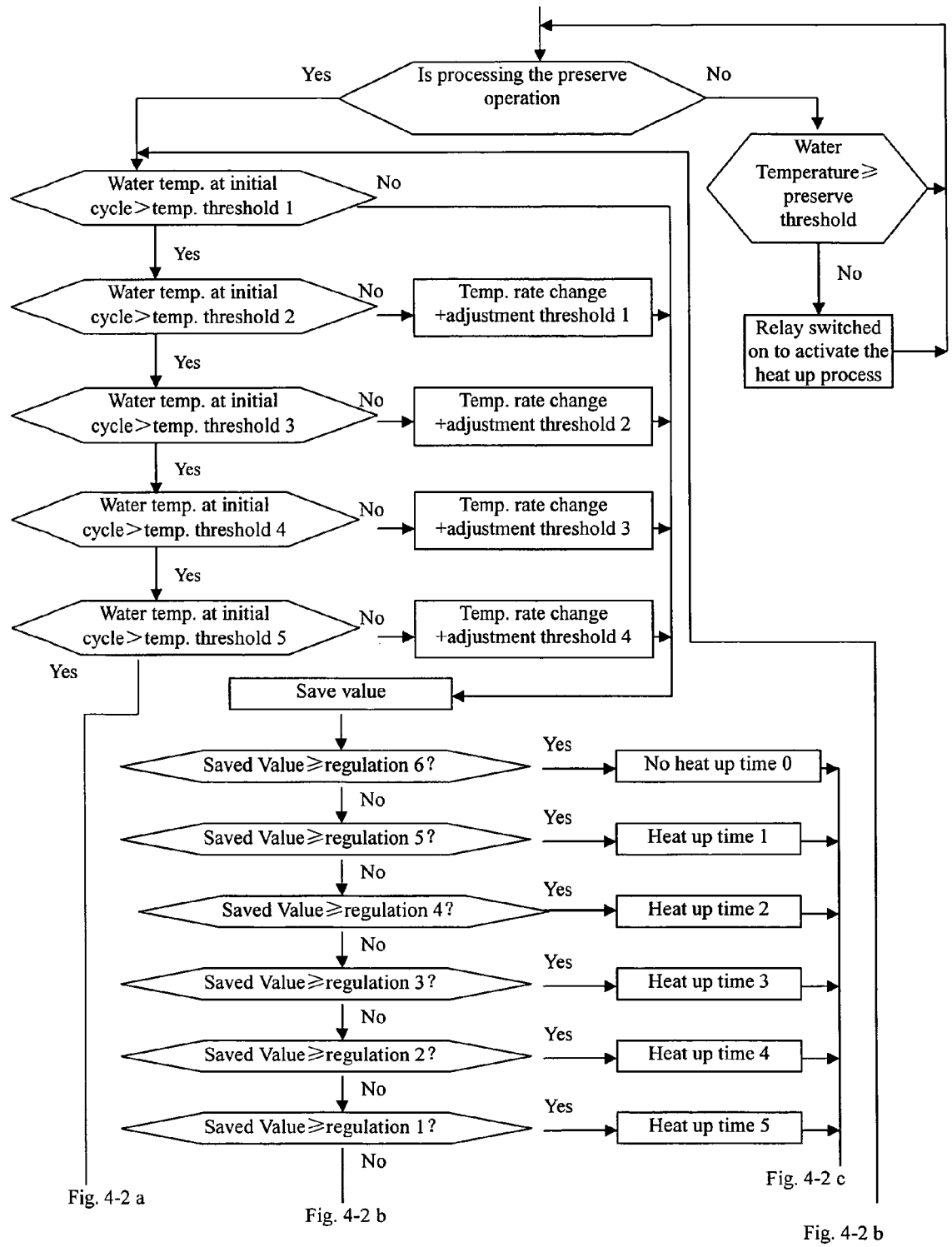
Figures 2, 4:
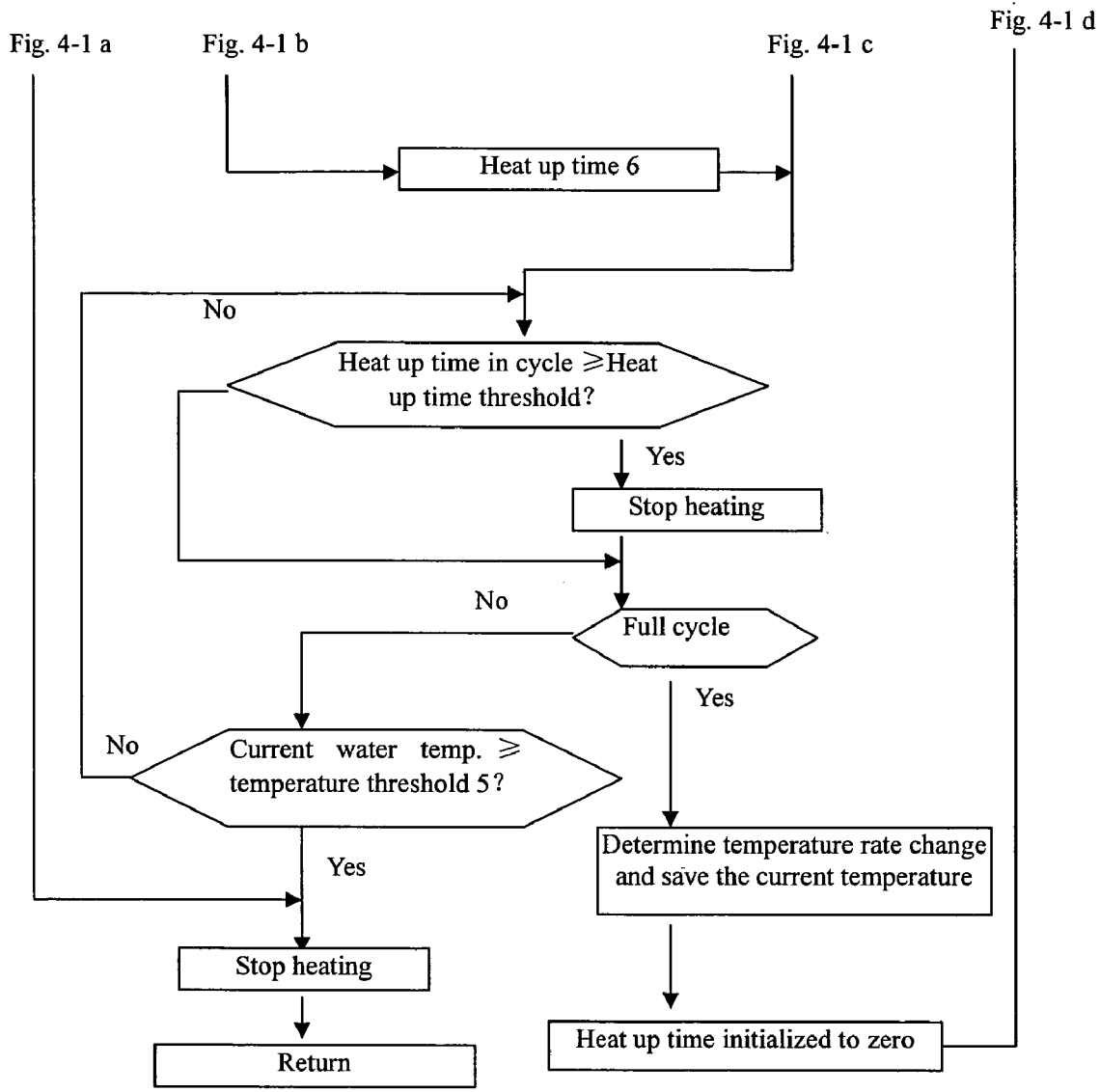

As shown in FIGS. 4-1 and 4-2, when the microprocessor controls the preserve process, the microprocessor initially determines whether the water is heated up to maintain at the preserve temperature. If not, the microprocessor will determine whether the water temperature is larger than the preset temperature threshold. If the water temperature is smaller than the preset temperature threshold, the heat up control signal is sent to the control circuit to close the circuit thereof for heating up the water.

The microprocessor compares the actual water temperature with a set of preset temperature thresholds, wherein values of the preset temperature thresholds are sorted in an ascending order. Firstly, the microprocessor compares the actual water temperature with the lowest value of the preset temperature threshold, wherein when the actual water temperature is higher than the lowest value of the preset temperature threshold, the microprocessor then compares the actual water temperature with the subsequently preset temperature threshold and so on. When the actual water temperature is higher than the highest value of the preset temperature threshold, the microprocessor will send the control signal to the control circuit to stop heating up the water. Accordingly, the set of preset temperature thresholds contains five different values, i.e. from the lowest first value to the highest fifth value, sorted in an ascending order. When the actual water temperature is higher than the corresponding preset temperature threshold, the microprocessor will determine the temperature rate change correspondingly, wherein the temperature rate change is then added to the preset adjustment threshold and the microprocessor will save the value thereof. The preset adjustment threshold contains four different values, i.e. from the lowest first value to the highest fourth value, sorted in an ascending order. It is worth to mention that the preset adjustment threshold is set in responsive to the temperature rate change of the water when the water is heated up. The saved value is compared with the highest value of the preset adjustment threshold. When the saved value is smaller than the highest value of the preset adjustment threshold, the saved value will then compare with the subsequent value of the preset adjustment threshold until the saved value compares with the lowest value of the preset adjustment threshold. In addition, the saved value will also compare with the preset regulation threshold, wherein the preset regulation threshold contains six different values, i.e. from the highest sixth value to the lowest first value, sorted in a descending order. The saved value is compared with the highest value of the preset regulation threshold, wherein when the saved value is lower than the highest value of the preset regulation threshold, the saved value is then compared with the subsequent value of the preset regulation threshold until the saved value is compared with the lowest value of the preset regulation threshold. When the saved value is higher than the corresponding value of the preset regulation threshold, a preset heat up time threshold is obtained, wherein the heat up time threshold is preset in responsive to the corresponding preset regulation threshold. Accordingly, the preset heat up time threshold contains seven different values, i.e. from the lowest zero value to the highest seventh value, sorted in an ascending order. It is worth to mention that the preset regulation threshold is set to determine the time required for heating up the water.

The first saved value is zero when the actual water temperature is smaller than the first value of the preset temperature threshold. The microprocessor determines the temperature rate change when the actual water temperature is smaller than the second value of the preset temperature threshold, wherein the temperature rate change is added to the first value of the preset adjustment threshold to form the second saved value. The microprocessor determines the temperature rate change when the actual water temperature is smaller than the third value of the preset temperature threshold, wherein the temperature rate change is added to the second value of the preset adjustment threshold to form the third saved value. The microprocessor determines the temperature rate change when the actual water temperature is smaller than the fourth value of the preset temperature threshold, wherein the temperature rate change is added to the third value of the preset adjustment threshold to form the fourth saved value. The microprocessor determines the temperature rate change when the actual water temperature is smaller than the fifth value of the preset temperature threshold, wherein the temperature rate change is added to the fourth value of the preset adjustment threshold to form the fifth saved value.

When the saved value is larger than the sixth value of the preset regulation threshold, the heat up time threshold is zero that the water does not require any heating process. The time period for heating up the water is set as the first heat up time threshold when the saved value is larger than the fifth value of the preset regulation threshold. The time period for heating up the water is set as the second heat up time threshold when the saved value is larger than the fourth value of the preset regulation threshold. The time period for heating up the water is set as the third heat up time threshold when the saved value is larger than the third value of the preset regulation threshold. The time period for heating up the water is set as the fourth heat up time threshold when the saved value is larger than the second value of the preset regulation threshold. The time period for heating up the water is set as the fifth heat up time threshold when the saved value is larger than the first value of the preset regulation threshold. The time period for heating up the water is set as the sixth heat up time threshold when the saved value is smaller than the first value of the preset regulation threshold.

The various values of the temperature threshold are arranged for determining the saved value formed by adding the temperature rate change to the preset adjustment threshold, so as to compare with the corresponding regulation threshold. Alternatively, the actual water temperature can be directly compared with the preset temperature threshold. When the actual water temperature is smaller than the preset temperature threshold, the microprocessor determines the temperature rate change to compare with the preset temperature rate change threshold. When the temperature rate change is larger than the preset temperature rate change threshold, the microprocessor sends the control signal to the control circuit to stop heating up the water. When the temperature rate change is smaller than the preset temperature rate change threshold, the microprocessor sends the control signal to the control circuit to time-delay the stop of heating up the water.

Various water temperatures correspondingly match with various preset adjustment thresholds. Therefore, a corresponding heat up time threshold can be obtained. Accordingly, when the water temperature is increasing, the higher value of the preset adjustment threshold is obtained and the lower preset heat up time threshold is obtained. In other words, the water temperature is inverse proportion to the preset heat up time threshold such that when the water temperature is increasing, the time required for heating up the water is reduced.

The microprocessor further contains a heat up cycle in term of the maximum heat up time period. When the heat up time is larger or equal to the preset heat up time threshold, the microprocessor sends out the control signal to the control circuit to stop heating up the water within the heat up cycle and determines whether the heat up time is the full heat up cycle. When the heat up time is smaller that the preset heat up time threshold, the microprocessor not only sends out the control signal to the control circuit to continuously heat up the water but also determines whether the heat up time is the full heat up cycle. When the heat up time is the full completed heat up cycle, the temperature rate change is determined and the current water temperature is measured. Then, the heat up time is initialized to become zero value and the current water temperature is compared with the fifth value of the preset temperature threshold. When the current water temperature is larger than the fifth value of the preset temperature threshold, the control circuit receives the control signal to stop heating up the water. When the current water temperature is smaller than the fifth value of the preset temperature threshold, the water is continuously heated up. At the same time, the heat up time is continuously compared with the preset heat up time threshold. Once the preserve controlling process is completed, the system is initialized and returns to its initial state.

What is claimed is:

1. A process of controlling an operation of an electric kettle comprising a heat-up circuit to heat up a predetermined volume of water in a controlled manner, wherein said process comprises the steps of:

(a) initializing a microprocessor to detect a temperature of said water via a temperature sensor in said electric kettle so as to set a system parameter;

(b) checking a status of said heat-up circuit, wherein said heat-up circuit is adapted to operate at an "ON" mode or an "OFF" mode, and determining a heat up time period for continuously heating up said water in said kettle;

(c) setting a preserve status of said water for maintaining said water at a preserve temperature;

(d) heating said water in said kettle in responsive to a condition of said water so as to heat up said water to said preserve temperature when said a temperature of said water is less than that of said preserve temperature;

(e) stopping heating said water in said kettle when said temperature of said water in said kettle reaches said preserve temperature; and (f) cutting off power supply to said heat-up circuit by a cut off circuit in a controlled manner, so that said cut off circuit is arranged to cut off said power supply to said heat-up circuit for preventing said water from being totally evaporated.

2. The process, as recited in claim 1, wherein in said step (a), said microprocessor is arranged to detect said water temperature five times per second at two spaced apart detecting points of said temperature sensor, wherein said microprocessor determines said water temperature by taking an average values of two temperature readings at said two detecting points of said temperature sensor in one second.

3. The process, as recited in claim 2, wherein step (a) comprises a step of setting a plurality of system parameters in said microprocessor, wherein said system parameters contain a preset heat up cycle, a maximum heat up time and an operation code of "temperature maintain after heat up".

4. The process, as recited in claim 2, wherein in said step (d), said heating of said water is controlled by said microprocessor, wherein when a heat up circuit is at an operation state, said microprocessor determines the time required for heating up said water, and when said heat up circuit is at an idle state, said microprocessor determines that a heat up time is zero.

5. The process, as recited in claim 3, wherein in said step (d), said heating of said water is controlled by said microprocessor, wherein when a heat up circuit is at an operation state, said microprocessor determines the time required for heating up said water, and when said heat up circuit is at an idle state, said microprocessor determines that a heat up time is zero.

6. The process, as recited in claim 2, wherein said step (d) comprises the step of sending a request signal to said microprocessor when said water need heating, wherein when said request signal is received by said microprocessor, said microprocessor is arranged to send out said a control signal to a control circuit to heat up said water and to stop heating up said water when said water reaches a predetermined temperature.

7. The process, as recited in claim 3, wherein said step (d) comprises the step of sending a request signal to said microprocessor when said water need heating, wherein when said request signal is received by said microprocessor, said microprocessor is arranged to send out said a control signal to a control circuit to heat up said water and to stop heating up said water when said water reaches a predetermined temperature.

8. The process, as recited in claim 5, wherein said step (d) comprises the step of sending a request signal to said microprocessor when said water need heating, wherein when said request signal is received by said microprocessor, said microprocessor is arranged to send out said a control signal to a control circuit to heat up said water and to stop heating up said water when said water reaches a predetermined temperature.

9. The process, as recited in claim 3, wherein said step (e) comprises a step of sending a "heat up and preserve" request signal to said microprocessor, wherein when said microprocessor receives said "heat up and preserve" request signal, said microprocessor is arranged to control said control circuit to heat up said water, wherein after said water is heated up, said water is then allow to be maintained at said preserve temperature.

10. The process, as recited in claim 5, wherein said step (e) comprises a step of sending a "heat up and preserve" request signal to said microprocessor, wherein when said microprocessor receives said "heat up and preserve" request signal, said microprocessor is arranged to control said control circuit to heat up said water, wherein after said water is heated up, said water is then allow to be maintained at said preserve temperature.

11. The process, as recited in claim 8, wherein said step (e) comprises a step of sending a "heat up and preserve" request signal to said microprocessor, wherein when said microprocessor receives said "heat up and preserve" request signal, said microprocessor is arranged to control said control circuit to heat up said water, wherein after said water is heated up, said water is then allow to be maintained at said preserve temperature.

12. The process, as recited in claim 5, further comprising a step of preventing said temperature sensor from being damaged by said microprocessor, which comprises the steps of:
    determining a rate of change of temperature in responsive to said average water temperature at said detecting points of said temperature sensor;
    comparing said rate of change of said temperature with a preset change threshold;
    when said rate of change of said temperature is larger than said preset change threshold, sending out said control signal by said microprocessor to said control circuit to stop heating up said water and to generate an alarm signal;
    when said rate of change of said temperature is smaller than said preset change threshold, determining, by said microprocessor, a rate of increase of said temperature, wherein when rate of increase of said temperature is larger than a preset threshold, said power of said heat up circuit is cut off and said alarm signal is generated.

13. The process, as recited in claim 8, further comprising a step of preventing said temperature sensor from being damaged by said microprocessor, which comprises the steps of:
    determining a rate of change of temperature in responsive to said average water temperature at said detecting points of said temperature sensor;
    comparing said rate of change of said temperature with a preset change threshold;
    when said rate of change of said temperature is larger than said preset change threshold, sending out said control signal by said microprocessor to said control circuit to stop heating up said water and to generate an alarm signal;
    when said rate of change of said temperature is smaller than said preset change threshold, determining, by said microprocessor, a rate of increase of said temperature, wherein when rate of increase of said temperature is larger than a preset threshold, said power of said heat up circuit is cut off and said alarm signal is generated.

14. The process, as recited in claim 11, further comprising a step of preventing said temperature sensor from being damaged by said microprocessor, which comprises the steps of:
    determining a rate of change of temperature in responsive to said average water temperature at said detecting points of said temperature sensor;
    comparing said rate of change of said temperature with a preset change threshold;
    when said rate of change of said temperature is larger than said preset change threshold, sending out said control signal by said microprocessor to said control circuit to stop heating up said water and to generate an alarm signal;
    when said rate of change of said temperature is smaller than said preset change threshold, determining, by said microprocessor, a rate of increase of said temperature, wherein when rate of increase of said temperature is larger than a preset threshold, said power of said heat up circuit is cut off and said alarm signal is generated.

* * * * *